(12) United States Patent
Liu et al.

(10) Patent No.: US 10,343,673 B2
(45) Date of Patent: Jul. 9, 2019

(54) METHOD AND APPARATUS FOR CONTROLLING A HYBRID POWERTRAIN SYSTEM

(71) Applicant: GM GLOBAL TECHNOLOGY OPERATIONS LLC, Detroit, MI (US)

(72) Inventors: Wei Liu, Warren, MI (US); Pablo Valencia, Jr., Northville, MI (US); Leng Mao, Warren, MI (US); Sudhakar Inguva, Troy, MI (US); Ryan B. Moulliet, Farmington Hills, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 121 days.

(21) Appl. No.: 15/634,749

(22) Filed: Jun. 27, 2017

(65) Prior Publication Data

US 2018/0370520 A1    Dec. 27, 2018

(51) Int. Cl.
*B60W 20/13*     (2016.01)
*B60W 10/06*     (2006.01)
*B60W 10/08*     (2006.01)
*B60W 10/26*     (2006.01)
*B60L 53/00*     (2019.01)

(52) U.S. Cl.
CPC .............. *B60W 20/13* (2016.01); *B60L 53/00* (2019.02); *B60W 10/06* (2013.01); *B60W 10/08* (2013.01); *B60W 10/26* (2013.01); *B60L 2240/545* (2013.01); *B60W 2510/244* (2013.01); *B60W 2710/0666* (2013.01); *B60W 2710/083* (2013.01); *Y10S 903/93* (2013.01)

(58) Field of Classification Search
None
See application file for complete search history.

(56) References Cited

U.S. PATENT DOCUMENTS

| 9,008,883 | B2 * | 4/2015 | Ichimoto | B60W 10/06 701/22 |
|---|---|---|---|---|
| 9,050,969 | B2 * | 6/2015 | Yu | B60W 10/06 |
| 2018/0134273 | A1 * | 5/2018 | Oh | B60W 10/06 |

* cited by examiner

*Primary Examiner* — Mussa A Shaawat
*Assistant Examiner* — Abdhesh K Jha
(74) *Attorney, Agent, or Firm* — Quinn IP Law

(57) ABSTRACT

A hybrid powertrain system includes a method for managing electrical charging of a DC power source, which includes determining an initial charge-sustaining SOC setpoint and an initial charge-termination SOC setpoint. The DC power source is dynamically monitored. An adjustment to a charge-sustaining SOC setpoint is determined based upon the ambient temperature, the device temperature and the SOC of the DC power source, and an updated charge-sustaining SOC setpoint is determined based upon the adjustment to the charge-sustaining SOC setpoint and the initial charge-sustaining SOC setpoint. An electric energy equalization factor α is determined, and an updated charge termination SOC setpoint can be determined based upon the electric energy equalization factor α, the updated charge-sustaining SOC setpoint and the initial charge-sustaining SOC setpoint. Charging of the DC power source is controlled based upon the updated charge-termination SOC setpoint.

18 Claims, 2 Drawing Sheets

US 10,343,673 B2

METHOD AND APPARATUS FOR CONTROLLING A HYBRID POWERTRAIN SYSTEM

INTRODUCTION

Hybrid powertrain systems generate propulsion torque from two or more energy sources, e.g., hydrocarbon-based fuels through an internal combustion engine, and electric power through one or more electric machines, with electric energy stored in a DC power source.

SUMMARY

A hybrid powertrain system for a vehicle is described, including an electric machine that is disposed to generate and transfer mechanical power to a driveline, a DC power source that is disposed to supply electric power to the electric machine, and a controller. The controller is in communication with the electric machine and the DC power source, and includes an instruction set that disposed to manage electrical charging of the DC power source. The instruction set implements a method for managing electrical charging of the DC power source, which includes determining beginning-of-life parameters associated with the DC power source, including an initial charge-sustaining SOC setpoint and an initial charge-termination SOC setpoint. Parameters associated with the DC power source are dynamically monitored, including an ambient temperature, a device temperature, and SOC of the DC power source. Parameters associated with a location, date of operation and a state-of-life (SOL) for the DC power source are also monitored. An adjustment to a charge-sustaining SOC setpoint is determined based upon the ambient temperature, the device temperature and the SOC of the DC power source, and an updated charge-sustaining SOC setpoint is determined based upon the adjustment to the charge-sustaining SOC setpoint and the initial charge-sustaining SOC setpoint. An electric energy equalization factor $\alpha$ is determined, and an updated charge termination SOC setpoint is capable of being determined based upon the electric energy equalization factor $\alpha$, the updated charge-sustaining SOC setpoint and the initial charge-sustaining SOC setpoint. Charging of the DC power source is controlled based upon the updated charge-termination SOC setpoint.

An aspect of the disclosure includes controlling operation of the powertrain system is controlled based upon the updated charge-sustaining SOC setpoint.

Another aspect of the disclosure includes determining the electric energy equalization factor $\alpha$ based upon the location, date of operation and the SOL.

Another aspect of the disclosure includes the powertrain system having an electric machine and an internal combustion engine, and controlling the electric machine and the internal combustion engine to cooperate to generate output torque in response to an output torque request in charge-sustaining mode when the SOC is less than the updated charge-sustaining SOC setpoint.

Another aspect of the disclosure includes controlling the electric machine to generate output torque in response to the output torque request when the SOC is greater than the updated charge-sustaining SOC setpoint.

Another aspect of the disclosure includes controlling charging of the DC power source to the updated charge termination SOC setpoint.

Another aspect of the disclosure includes controlling the charging of the DC power source to the updated charge-termination SOC setpoint during an off-line charging event.

Another aspect of the disclosure includes the initial charge-sustaining SOC setpoint being a minimum SOC state associated with operating the powertrain system in a charge-depletion mode.

Another aspect of the disclosure includes the initial charge-termination SOC setpoint being a maximum SOC associated with charging the DC power source.

The above features and advantages and other features and advantages of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
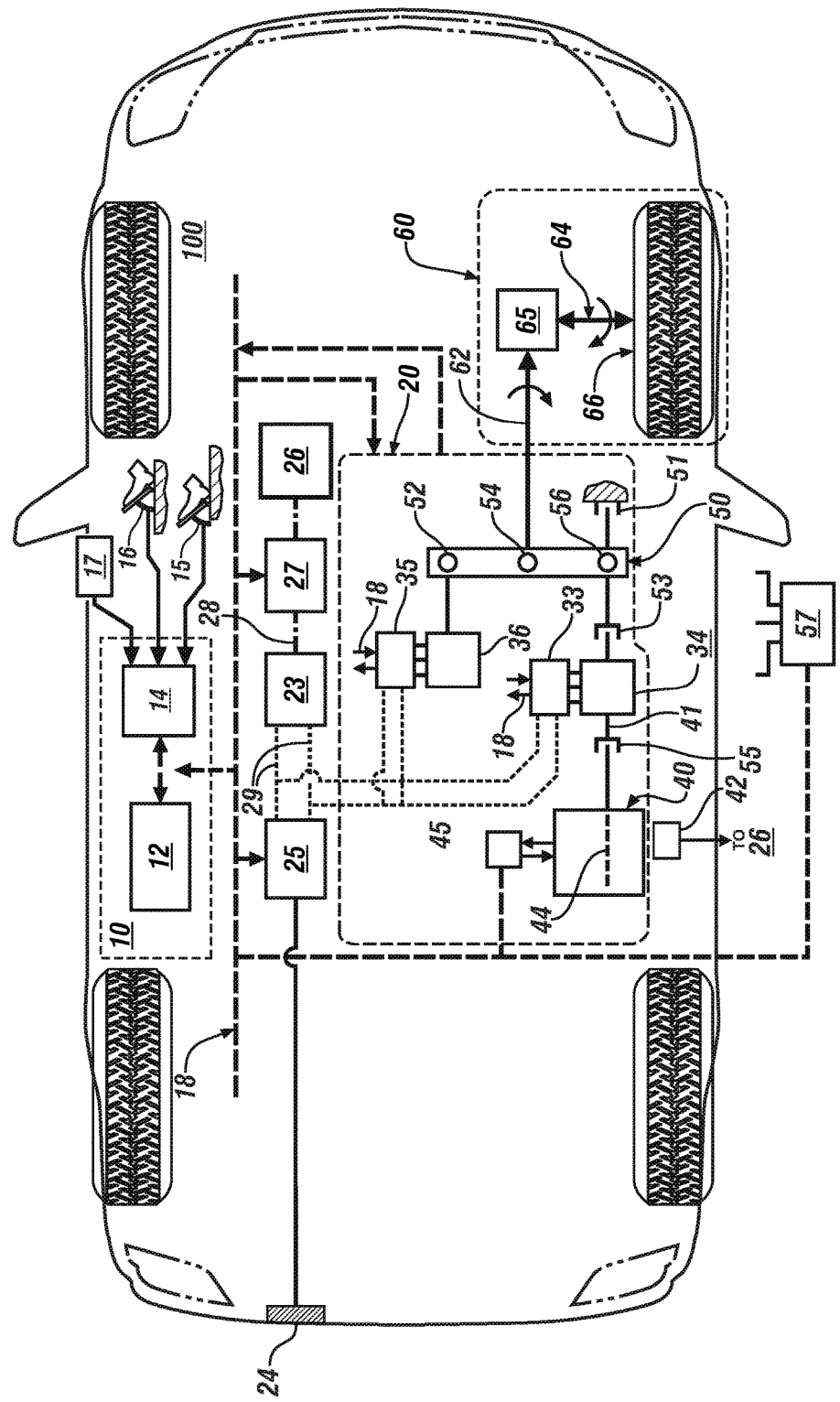
FIG. 1 schematically illustrates a hybrid powertrain system that includes an internal combustion engine, transmission and electric machines that couple to a driveline, in accordance with the disclosure.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Embodiments of hybrid powertrain system can include an internal combustion engine and one or more electric machines that are arranged to generate propulsion torque and also generate electric power may instead be employed within the scope of this disclosure. Some examples of suitable vehicles employing some form of hybrid powertrain systems include, but are not limited to hybrid electric vehicles (HEVs), plug-in hybrid electric vehicles (PHEVs), extended range electric vehicles (EREVs), two-mode hybrids, power-assist hybrids, series hybrids, parallel hybrids, series-parallel hybrids, power-split hybrids, beltalternator-starter hybrids, hydraulic hybrids, pneumatic hybrids, etc. Vehicles may include passenger cars, crossover vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with various hybrid vehicle configurations and is not limited to a particular type. Furthermore, the following description is provided in context of a hybrid powertrain system that includes an internal combustion engine and two electric machines, which is a non-limiting system provided for purposes of illustrating the concepts described and claimed herein.

Control systems for operating hybrid powertrain systems control torque outputs of the engine and electric machine(s) and apply torque transfer elements in the transmission to transfer torque in response to operator-commanded output torque requests, taking into account fuel economy, emissions, drivability, and other factors. A control system monitors various inputs from the vehicle and the operator and provides operational control of the hybrid powertrain, including controlling transmission operating mode and gear shifting, controlling torque outputs from the engine and electric machine(s), and regulating the electrical power interchange among the electrical DC power source and the electric machines to manage outputs of the transmission, including torque and rotational speed.

Hybrid powertrain systems may operate in an electric vehicle (EV) mode, wherein all propulsion torque is generated by the electric machine(s) with the internal combustion engine in an OFF state, and electrically-variable modes (EVT), wherein the internal combustion engine is in an ON state and may generate some or all of the propulsion torque, or may be transferred to an electric machine to generate electric power that is transferable to the electric machine(s) to generate propulsion torque.

Operating a hybrid powertrain system in the EV mode may enhance customer satisfaction. However, operating in the EV mode at or near system limits for such operation may reduce customer satisfaction related to engine startability and tip-in response.

Referring now to the drawings, wherein the showings are for the purpose of illustrating certain exemplary embodiments only and not for the purpose of limiting the same, FIG. 1 schematically shows a vehicle 100 including a hybrid powertrain system 20 coupled to a driveline 60 and controlled by a control system 10. Like numerals refer to like elements throughout the description. The powertrain system 20 can include multiple torque-generating devices including an internal combustion engine (engine) 40 and geartrain 50, and first and second electrically-powered torque machines (electric machines) 34, 36, respectively, that rotatably couple the gear train 50. An output member 62 couples between the gear train 50 and a driveline 60. Thus, the internal combustion engine 40 and the first and second electric machines 34, 36 couple to the gear train 50 and are controllable to generate an output torque that is transferred to the driveline 60 as propulsion torque for the vehicle 100. By way of definition, 'output torque' refers to positive (tractive) torque and negative (braking) torque that is generated by the powertrain system 20 and is transferred to the output member 62. The powertrain system 20 is "hybrid" in that it employs two or more sources of stored energy to provide power for vehicle propulsion. The arrangement shown with reference to FIG. 1 is in the form of an output-split electrically variable transmission, and is a non-limiting embodiment.

One embodiment of the engine and transmission 40 and the first and second electric machines 34, 36 that couple to the gear train 50 and generate output torque that is transferred to the driveline 60 to generate propulsion torque is now described. A crankshaft 44 of the internal combustion engine 40 couples to an input member 41 that couples to a rotor of the first electric machine 34 via a third clutch 55. An output member from the rotor of the first electric machine 34 couples via a second clutch 53 to a ring gear 56 of the gear train 50. The second electric machine 36 rotatably couples to a sun gear 52 of the gear train 50. A planet gear carrier 54 of the gear train 50 couples via the output member 62 to the driveline 60. The ring gear 56 is couplable via a first clutch/brake 51 to a chassis ground. In one embodiment, the gear train 50 is a simple planetary gear set including sun gear 52, planet gear and carrier 54, and ring gear 56. A transmission controller (TCM) 57 monitors rotational speeds of various rotating members and controls activations of the first, second and third clutches 51, 53 and 55.

The engine 40 may be embodied as a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force that is transferred via pistons and connecting rods to the crankshaft 44 to produce torque. Operation of the engine 40 is controlled by an engine controller (ECM) 45. The engine 40 may include a low-voltage solenoid-actuated electrical starter 42 for engine starting in response to a key-crank event in one embodiment. The engine 40 is configured to execute engine stop/start operations, including executing autostart and autostop routines during vehicle operation. The engine 40 may be configured to execute autostart and autostop control routines, fuel cutoff (FCO) control routines and cylinder deactivation control routines during ongoing operation of the powertrain system 20. The engine 40 is considered to be in an OFF state when it is not rotating. The engine 40 is considered to be in an ON state when it is rotating, including one or more FCO states in which it is spinning and unfueled. The transmission may be a suitable device, and is a step-gear transmission that is configured to transfer engine speed and torque at one of a plurality of fixed gear ratios in response to operator inputs in one embodiment.

The first and second electric machines 34, 36 may be embodied as high-voltage multi-phase electric motor/generators that electrically connect to a high-voltage DC power source (battery) 25 via first and second inverter modules 33, 35, respectively. The terms "DC power source" and "battery" are used interchangeably throughout the specification. The first and second electric machines 34, 36 are configured to convert stored electric energy to mechanical power and convert mechanical power to electric energy that may be stored in the battery 25. The battery 25 may be a suitable high-voltage DC power source storage device, e.g., a multi-cell lithium ion device, an ultracapacitor, or another suitable device without limitation. The capability of the battery 25 can be described in context of stored energy and power capability, wherein the power capability relates to work or transmitted energy (in units of watts=joules/sec), and the stored energy relates to the capacity to do work (in units of joule=watt-seconds). Thus, the power capability relates to powertrain and vehicle performance capability, e.g., acceleration and maximum speed, and the stored energy relates to range of operation, i.e., distance travelled. In one embodiment, the battery 25 may electrically connect via an on-vehicle battery charger 24 to a remote, off-vehicle electric power source for charging while the vehicle 100 is stationary. The battery 25 electrically connects to the first inverter module 33 via the high-voltage DC bus 29 to transfer high-voltage DC electric power to the first electric machine 34 in response to control signals originating in the control system 10. Likewise, the battery 25 electrically connects to the second inverter module 35 via the high-voltage DC bus 29 to transfer high-voltage DC electric power to the second electric machine 36 in response to control signals originating in the control system 10.

Each of the first and second electric machines 34, 36 includes the rotor and a stator, and electrically connects to the battery 25 via the corresponding first and second inverter modules 33, 35, respectively, and the high-voltage DC bus 29. The first and second inverter modules 33, 35 are both configured with suitable control modules including power transistors, e.g., IGBTs for transforming high-voltage DC electric power to high-voltage AC electric power and transforming high-voltage AC electric power to high-voltage DC electric power. Each of the first and second inverter modules 33, 35 may employ pulsewidth-modulating (PWM) control to convert stored DC electric power originating in the battery 25 to AC electric power to drive the respective first and second electric machines 34, 36 to generate torque. Similarly, each of the first and second inverter modules 33, 35 converts mechanical power transferred to the respective first and second electric machines 34, 36 to DC electric power to generate electric energy that is storable in the battery 25, including as part of a regenerative power control strategy. The first and second inverter modules 33, 35 are both configured to receive motor control commands and control inverter states to provide the motor drive and regenerative braking functionality. In one embodiment, a DC/DC electric power converter 23 electrically connects to a low-voltage bus 28 and a low-voltage battery 27, and electrically connects to the high-voltage DC bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 42.

The driveline 60 may include a differential gear device 65 that mechanically couples to an axle, transaxle or half-shaft 64 that mechanically couples to a wheel 66 in one embodiment. The driveline 60 transfers propulsion torque between the gear train 50 and a road surface.

An operator interface 14 of the vehicle 100 includes a controller that signally connects to a plurality of human/machine interface devices through which the vehicle operator commands operation of the vehicle 100. The human/machine interface devices include, e.g., an accelerator pedal 15, a brake pedal 16, a transmission range selector (PRNDL) 17. Other human/machine interface devices may include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the rotational direction of the output member 62 in either a forward or a reverse direction. As shown, transmission range selector 17 may also be capable of selecting a desired powertrain operating mode, such as a normal mode, a sport mode, a mountain mode, or another suitable powertrain operating mode. The powertrain operating modes are employed to provide operator preferences to the controller 12, with such preferences including one of a plurality of desired transmission shift patterns and one of a plurality of desired battery SOC levels. One of the plurality of desired transmission shift patterns may be selected based upon shifting patterns associated with the speed and load, such as an aggressive shift pattern or a shift pattern that maximizes fuel economy. One of a plurality of desired battery SOC levels may be selected depending upon expected operation of the vehicle, such as climbing a grade, or discharging to achieve a minimum SOC in anticipation of reaching a destination point.

The control system 10 includes controller 12 that signally connects to the operator interface 14. The controller 12 may include a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the high-voltage battery 25, the first and second inverter modules 33, 35, the ECM 45 and the TCM 57, either directly or via a communications bus 18 to monitor and control operation thereof.

The controller 12 commands operation of the powertrain system 20, including selecting and commanding operation in one of a plurality of operating modes to generate and transfer torque between the torque generative devices, e.g., the engine 40 and the first and second electric machines 34, 36 and the driveline 60. The operating modes may include one or more electric-vehicle (EV) modes wherein the engine 40 is in the OFF state and the first and/or the second electric machines 34, 36 generate propulsion torque. The operating modes may also include an electrically-variable mode wherein the engine 40 and one or both of the first and second electric machines 34, 36 generate propulsion torque. The operating modes may also include an extended-range EV mode wherein the engine 40 is in the ON state and generating electric power through the first electric machine 34 and the second electric machine 36 is generating propulsion torque. The extended-range EV mode, the EV mode and the electrically-variable mode each have an associated battery charging mode that may be either a charge-sustaining mode or a charge-depleting mode. The charge-depletion mode and the charge-sustaining mode refer to control routines for managing a state of charge (SOC) of the battery 25. The charge-depleting mode may include operating with the engine 40 in the OFF state, and the charge-sustaining mode include operating with the engine 40 in the ON state.

The charge-depleting mode indicates powertrain operation wherein SOC of the battery 25 is depleted at a predetermined rate. In one embodiment, this includes operating the powertrain system 20 in the EV mode. In the charge-depletion mode, the controller 12 controls powertrain operation until the SOC of the battery 25 reaches a minimum SOC state during a vehicle trip, or key-on cycle, and manages torque inputs from the internal combustion engine 40 and from the electric machine(s) 34, 36 based thereon.

The charge-sustaining (CS) mode indicates powertrain operation wherein a state of charge (SOC) of the battery 25 is maintained at a predetermined level with a possibility of short-term variations associated with vehicle operation. In the charge-sustaining mode, the controller 12 controls powertrain operation such that the SOC of the battery 25 is maintained at or near a setpoint, and has the same SOC at end of a vehicle trip as it had at a beginning of the vehicle trip, and manages torque inputs from the internal combustion engine 40 and the electric machine(s) 34, 36 based thereon.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

The powertrain system 20 includes a communications scheme including the communications bus 18 to effect communications in the form of sensor signals and actuator command signals between the control system 10, the vehicle 100 and the powertrain system 20. The communications scheme employs one or more communications systems and devices, including, e.g., the communications bus 18, a direct connection, a local area network bus, a serial peripheral interface bus, and wireless communications to effect information transfer. Communication between controllers and communication between controllers, actuators and/or sensors may be accomplished using a direct wired link, a networked communications bus link, a wireless link or another suitable communications link. Communication includes exchanging data signals in a suitable form, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Methods and systems, in the form of control routines and associated calibrations may be employed to provide improved responsiveness of the powertrain system to operator commands such as accelerator pedal tip-in events. Such responsiveness may provide an improved operator perception associated with powertrain operation in the EV mode, including operation that includes one of a plurality of operator-selectable modes. This includes a control routine that may manipulate engine speed and engine torque at different vehicle speeds and axle torque commands based on different operator-selectable modes such that the operator is less likely to perceive engine operation. The control routine controls the engine to act differently based on charge state, operator-selectable mode, vehicle speed, and axle torque commands while generating output torque that is responsive to the output torque request.

Parameters associated with the DC power source 25 include a plurality of beginning-of-life (BOL) states, including an initial charge-termination (CT) SOC setpoint and an initial charge-sustaining (CS) SOC setpoint, which can be determined during vehicle and/or battery development. The initial charge-termination SOC setpoint and an initial charge-sustaining SOC setpoint can be preset to levels that provide consistent operation performance during cold weather condition. However, sustained operation at the preset levels for the initial charge-termination SOC setpoint and the initial charge-sustaining SOC setpoint may negatively affect service life of the DC power source 25.

Figure 2:
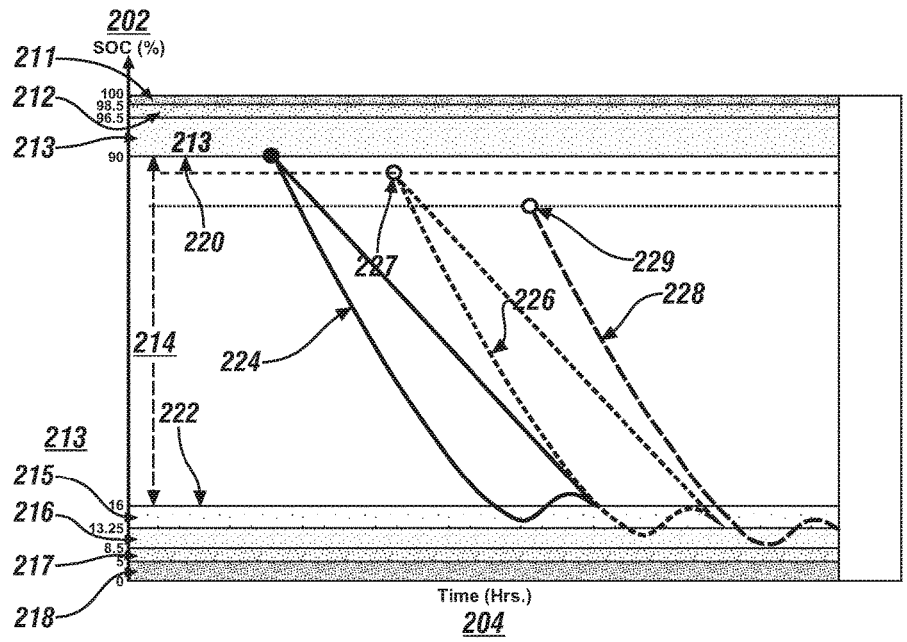
FIG. 2 graphically shows a plurality of SOC setpoints associated with an embodiment of a DC power source that is employed in an embodiment of the hybrid powertrain system that is described with reference to FIG. 1, in accordance with the disclosure.

FIG. 2 graphically shows a plurality of SOC setpoints associated with an embodiment of a battery 25 that is employed in an embodiment of the hybrid powertrain system 20 that is described with reference to FIG. 1. SOC values (%) are indicated on the vertical axis 202, and elapsed time (hrs.) is indicated on the horizontal axis 204. A plurality of SOC regions are indicated, including an unusable region 211 associated with SOC near a maximum achievable SOC, a charge power ramp-out region 212 associated with over-charging buffer, an expandable energy region 213 associated with permissible variations in the charging range, a charge-depletion region 214, a charge-sustaining mode discharge buffer 215, cold-weather buffer discharge portion 216, which is reserved to facilitate cold cranking of the engine, a discharge power ramp-out region 217, and another unusable region 218 that is associated with SOC near a minimum value and providing insufficient power to permit operation. The charge-sustaining mode discharge buffer 215 provides a discharge buffer to accommodate a discharge overshoot during operation. The cold-weather buffer discharge portion 216 reserves a portion of the stored battery power to permit cold cranking of the engine 20 under cold ambient conditions.

An initial charge-termination SOC setpoint is indicated by line 220, and represents a maximum SOC state at which charging is terminated when the DC power source 25 is at 100% of its state of life, i.e., new, and is operating under nominally normal temperature conditions. An initial charge-sustaining SOC setpoint is indicated by line 222, and represents a minimum SOC state at which discharging is terminated when the DC power source 25 is at 100% of its state of life, i.e., new, and is operating under nominally normal temperature conditions. Line 224 indicates a discharge profile for the DC power source 25 when the hybrid powertrain system is operating in the charge-depletion mode. Line 226 includes a charge-termination SOC setpoint 227 that is less than the initial charge-termination SOC setpoint 220. Line 228 includes a charge-termination SOC setpoint 229 that is less than the initial charge-termination SOC setpoint 220 and the charge-termination SOC setpoint 227 associated with line 226. Lines 226 and 228 introduce possible charging strategies and discharging strategies that can be implemented when the cold-weather buffer discharge portion 216 is unneeded due to ambient temperatures that are greater than ambient temperatures associated with cold weather, e.g., greater than 15 C.

Figure 3:
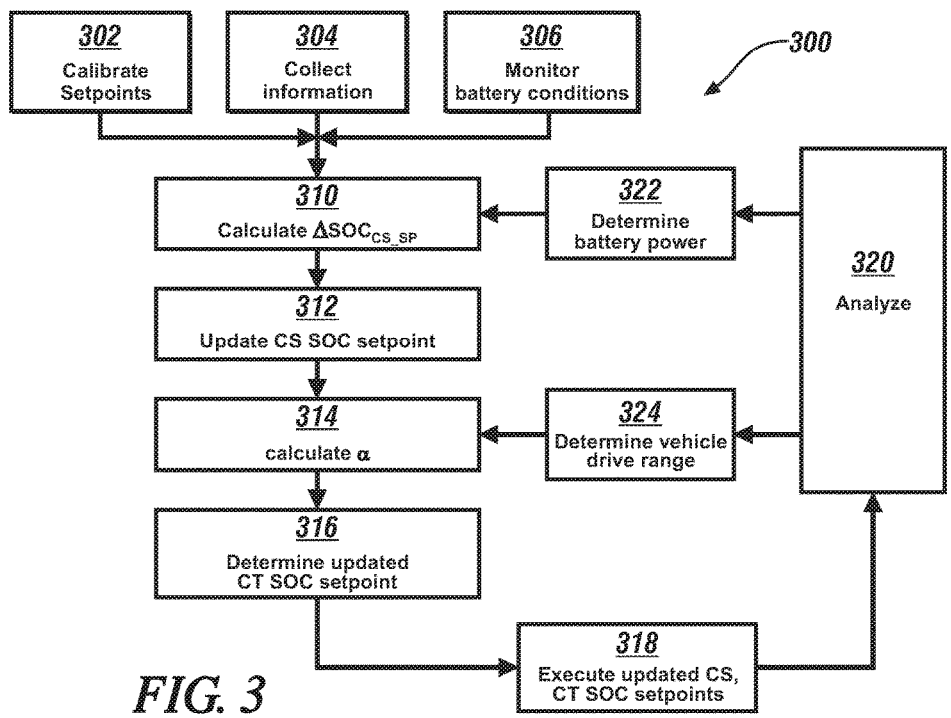
FIG. 3 schematically shows, in block diagram form, a flowchart associated with determining and controlling a SOC setpoint for the DC power source that is employed in an embodiment of the hybrid powertrain system that is described with reference to FIG. 1, in accordance with the disclosure.

FIG. 3 schematically shows a process 300, which can be implemented in an embodiment of the vehicle 100 and powertrain system 20 described with reference to FIG. 1, employing an embodiment of the plurality of SOC setpoints associated with an embodiment of a DC power source, as described with reference to FIG. 2. The process 300 can be executed as one or more control routines in the controller 10 to dynamically determine an updated charge-sustaining SOC setpoint and an updated charge termination SOC setpoint in real-time based on vehicle operation data, an ambient temperature and a state of life of the DC power source 25. Such operation can minimize an effect on the life of the DC power source 25 that may be associated with sustained operation at the preset levels for the initial charge-termination SOC setpoint and the initial charge-sustaining SOC setpoint may negatively affect service life of the DC power source 25. More specifically, the updated charge-sustaining SOC setpoint and the updated charge termination SOC setpoint can be advantageously reduced under conditions that indicate that there is little or no likelihood that the vehicle will be exposed to a cold cranking event or another related operating state due to ambient and other conditions. Thus, there is less need to reserve a portion of the stored battery power, i.e., the cold-weather buffer discharge portion 216 described with reference to FIG. 2.

Table 1 is provided as a key wherein the numerically labeled blocks and the corresponding functions are set forth as follows, corresponding to the process 300. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 302 | Calibrate initial CS setpoint, Charge termination setpoint |
| 304 | Collect information: Location, Date, Time, State of Life, etc. |
| 306 | Monitor battery conditions: ambient temperature, battery temperature, SOC |
| 310 | Calculate $\Delta SOC_{CS\_SP}$ |
| 312 | Determine updated CS SOC setpoint |
| 314 | Calculate electric energy equalization factor $\alpha$ |
| 316 | Determine updated CT SOC setpoint |
| 318 | Execute updated CS, CT SOC setpoints |
| 320 | Analyze real-time vehicle operating information with updated CS, CT SOC setpoints |
| 322 | Determine battery power capability at updated CS SOC setpoint, battery temperature |
| 324 | Determine vehicle drive range at updated CS, CT SOC setpoints and the battery temperature |

Execution of the process 300 may proceed as follows. The steps of the process 300 may be executed in a suitable order, and are not limited to the order described with reference to FIG. 3.

Initial values can be determined at a vehicle development phase and calibrated into the controller 10 (302), with the initial values including a charge-termination (CT) SOC setpoint and a charge-sustaining SOC setpoint at the beginning of life (BOL) of the vehicle 100 and/or battery 25. Furthermore, the charge termination SOC setpoint can be gradually extended to an end-of-life (EOL) point. By way of a non-limiting example, in one embodiment, at BOL the charge-sustaining SOC setpoint can be set at 16% SOC and the charge termination SOC setpoint can be set as 90%, and the EOL charge termination SOC setpoint can be set at 96.5% to accommodate battery capacity decay. The basic principle of determining the charge-sustaining SOC setpoint is that the battery 25 can support cold cranking at very low ambient temperatures such as −30° C., and the battery 25 can have much greater cranking capability at ambient temperatures that are greater than −10° C. Furthermore, the battery 25 can deliver enough power at the charge-sustaining SOC setpoint to support vehicle operation, including acceptable vehicle launching performance. Also, the battery 25 can have an energy buffer that assists engine start/stop operation and uphill operating condition, e.g., the charge-sustaining mode discharge buffer 215 that is described with reference to FIG. 2. The BOL charge-sustaining SOC setpoint is the default battery CS operation SOC setpoint determined at vehicle development phase.

Vehicle information is collected, including vehicle location, date, time, battery state of life conditions, etc. (304), and battery conditions including ambient temperature, battery temperature and SOC are monitored (306). This information is employed to calculate an adjustment to the charge-sustaining SOC setpoint ($\Delta SOC_{CS\_SP}$).

The adjustment to the charge-sustaining SOC setpoint ($\Delta SOC_{CS\_SP}$) is determined based upon battery cold cranking capability for the ambient and battery temperatures, power capacity of the battery 25 at the operation date (310).

The updated charge-sustaining SOC setpoint is determined as follows in Eq. 1 (312).

$$SOC_{CS\_SP} = SOC_{CS\_SP\_BOL} - \Delta SOC_{CS\_SP}(\text{Operation\_date}, \text{Temp}, SOL) \quad [1]$$

The term $SOC_{CS\_SP\_BOL}$ represents the charge-sustaining SOC setpoint at beginning of life, and $\Delta SOC_{CS\_SP}(\text{Operation\_date}, \text{Temp}, SOL)$ represents the adjustment to the charge-sustaining SOC setpoint adjustment which determined based battery cold cranking capability, power capacity at the operation date.

An electric energy equalization factor α is also determined (314). The electric energy equalization factor α accommodates device-specific capability that is associated with battery power and includes differences in energy capacity and energy density at high levels of SOC as compared to energy density at low levels of SOC, and is selected to ensure that the battery 25 has a sufficient amount of stored energy to achieve a specified operating range while the powertrain system is operating in the EV mode. As such, the electric energy equalization factor α is determined to equalize the energy amount in upper and lower SOC zones. As such, the charge termination SOC setpoint can be updated so that the battery 25 stores a consistent amount of electric energy over its service life, which is the same as the designed amount at BOL of the battery 25.

An updated charge termination SOC setpoint is determined based upon the charge termination SOC setpoint at beginning of life, the charge-sustaining SOC setpoint adjustment and the electric energy equalization factor α, as follows in Eq. 2 (316).

$$SOC_{chg\_term\_sp} = SOC_{chg\_term\_sp\_BOL} - \alpha \cdot \Delta SOC_{CS\_SP}(\text{Operation\_date}, \text{Temp}, SOL) \quad [2]$$

The term $SOC_{chg\_term\_sp}$ represents the updated charge termination SOC setpoint and the term $SOC_{chg\_term\_sp\text{-}BOL}$ represents the charge termination SOC setpoint at beginning of life. The basic principle of determining the updated charge termination SOC setpoint is to have sufficient amount of stored energy in the battery to support a predetermined range of operation in the EV mode. By way of a non-limiting example, a charge termination SOC setpoint can be set at 90% so that the battery 25 can delivery 14.2 kWh electric energy to support 53 EV miles at its beginning of life. In order to have consistent EV mile range in early service years, battery charge termination setpoint may increase to a maximum allowable point, for example a charge termination SOC setpoint of 96.5%. As such, either the updated charge-sustaining SOC setpoint or the updated charge termination SOC setpoint can be determined in real-time based on vehicle operation date, ambient temperature and state of battery life to minimize the battery degradation with service time. The vehicle operation is executed employing the updated charge termination SOC setpoint and the updated charge-sustaining SOC setpoint (318).

Data associated with vehicle operation, battery operation, ambient and battery temperatures is dynamically monitored and analyzed in real-time during vehicle operation with the charge termination SOC setpoint and the charge-sustaining SOC setpoint (320). This data is employed to determine a battery power capability at the charge-sustaining SOC setpoint and ambient temperature (322) and a vehicle drive range for the charge termination SOC setpoint and the charge-sustaining SOC setpoint, taking into account the ambient and battery temperatures (324). These results are provided as feedback to determine the adjustment to the charge-sustaining SOC setpoint ($\Delta SOC_{CS\_SP}$) (310) and to determine the electric energy equalization factor α during operation (314).

The battery SOC operation control strategies can be adapted to accommodate changes to the SOC and cold cranking capacity, operation temperature and battery degradations that can occur in-use and/or over time. The battery 25 can be charged at lower SOC termination points than a default SOC termination point during its service life, which may extend its service life.

When the vehicle 100 is configured as a PHEV, the charging of the DC power source can be executed during an off-line charging event, with the updated charge-termination SOC setpoint being employed as the value at which charging is terminated.

The flowchart of FIG. 3 illustrates one embodiment of the method, which can be executed by an on-vehicle computing system that is receiving instructions from one or more modules in communication with the system. This can be implemented through a computer algorithm, machine executable code, non-transitory computer-readable medium, or software instructions programmed into a suitable programmable logic device(s) of the vehicle, such as the one or more modules, a server in communication with the vehicle computing system, a mobile device communicating with the vehicle computing system and/or server, other controller in the vehicle, or a combination thereof. Although the various steps shown in the flowchart diagram appear to occur in a chronological sequence, at least some of the steps may occur in a different order, and some steps may be performed concurrently or not performed.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for managing electrical charging of a DC power source that is disposed to supply electric power to an electric machine of a hybrid powertrain system for tractive effort, wherein the powertrain system is operative in a charge-sustaining mode and a charge-depletion mode with regard a state of charge (SOC) of the DC power source, the method comprising:
   determining beginning-of-life parameters associated with the DC power source, including an initial charge-sustaining SOC setpoint and an initial charge-termination SOC setpoint;
   dynamically monitoring parameters associated with the DC power source, including an ambient temperature, a device temperature, and SOC of the DC power source;
   dynamically monitoring a location, date of operation and a state-of-life (SOL) associated with the DC power source;
   determining an adjustment to a charge-sustaining SOC setpoint based upon the ambient temperature, the device temperature and the SOC of the DC power source;
   determining an updated charge-sustaining SOC setpoint based upon the adjustment to the charge-sustaining SOC setpoint and the initial charge-sustaining SOC setpoint;
   determining an electric energy equalization factor α based upon the location, date of operation and the SOL;

determining an updated charge termination SOC setpoint based upon the electric energy equalization factor $\alpha$, the updated charge-sustaining SOC setpoint and the initial charge-sustaining SOC setpoint; and controlling charging of the DC power source based upon the updated charge-termination SOC setpoint.

2. The method of claim 1, further comprising controlling operation of the powertrain system based upon the updated charge-sustaining SOC setpoint.

3. The method of claim 2, wherein the powertrain system includes an electric machine and an internal combustion engine, the method further comprising controlling the electric machine and the internal combustion engine to cooperate to generate output torque in response to an output torque request in the charge-sustaining mode when the SOC is less than the updated charge-sustaining SOC setpoint.

4. The method of claim 3, further comprising controlling the electric machine to generate output torque in response to the output torque request when the SOC is greater than the updated charge-sustaining SOC setpoint.

5. The method of claim 1, wherein controlling charging of the DC power source based upon the updated charge-termination SOC setpoint comprises charging the DC power source to the updated charge termination SOC setpoint.

6. The method of claim 1, wherein controlling charging of the DC power source based upon the updated charge-termination SOC setpoint comprises controlling the charging of the DC power source to the updated charge-termination SOC setpoint during an off-line charging event.

7. The method of claim 1, wherein the initial charge-sustaining SOC setpoint comprises a minimum SOC state associated with operating the powertrain system in a charge-depletion mode.

8. The method of claim 1, wherein the initial charge-termination SOC setpoint comprises a maximum SOC associated with charging the DC power source.

9. The method of claim 1, wherein the electric energy equalization factor $\alpha$ is determined to adjust the charge-termination SOC setpoint for the DC power source that results in the DC power source storing an amount of electric energy that is the same as an amount of stored energy at BOL of the DC power source based upon the location, date of operation and the SOL.

10. A hybrid powertrain system for a vehicle, comprising:
an electric machine disposed to generate and transfer mechanical power to a driveline;
a DC power source disposed to supply electric power to the electric machine;
a controller, in communication with the electric machine and the DC power source, the controller including an instruction set disposed to manage electrical charging of the DC power source, the instruction set executable to:
determine beginning-of-life parameters associated with the DC power source, including an initial charge-sustaining state of charge (SOC) setpoint and an initial charge-termination SOC setpoint;
dynamically monitor parameters associated with the DC power source, including an ambient temperature, a device temperature, and SOC of the DC power source;
dynamically monitoring a location, date of operation and a state-of-life (SOL) associated with the DC power source;

determine an adjustment to a charge-sustaining SOC setpoint based upon the ambient temperature, the device temperature and the SOC of the DC power source;
determine an updated charge-sustaining SOC setpoint based upon the adjustment to the charge-sustaining SOC setpoint and the initial charge-sustaining SOC setpoint;
determine an electric energy equalization factor $\alpha$ based upon the location, date of operation and the SOL;
determine an updated charge termination SOC setpoint based upon the electric energy equalization factor $\alpha$, the updated charge-sustaining SOC setpoint and the initial charge-sustaining SOC setpoint; and
control charging of the DC power source based upon the updated charge-termination SOC setpoint.

11. The hybrid powertrain system of claim 10, further comprising the instruction set executable to control operation of the powertrain system based upon the updated charge-sustaining SOC setpoint.

12. The hybrid powertrain system of claim 11, wherein the powertrain system includes an electric machine and an internal combustion engine, and wherein the instruction set is executable to control the electric machine and the internal combustion engine to cooperate to generate output torque in response to an output torque request in charge-sustaining mode when the SOC is less than the updated charge-sustaining SOC setpoint.

13. The hybrid powertrain system of claim 12, wherein the instruction set is executable to control the electric machine to generate output torque in response to the output torque request when the SOC is greater than the updated charge-sustaining SOC setpoint.

14. The hybrid powertrain system of claim 10, wherein the instruction set executable to control charging of the DC power source based upon the updated charge-termination SOC setpoint comprises the instruction set executable to charge the DC power source to the updated charge termination SOC setpoint.

15. The hybrid powertrain system of claim 10, wherein the instruction set executable to control charging of the DC power source based upon the updated charge-termination SOC setpoint comprises the instruction set executable to control the charging of the DC power source to the updated charge-termination SOC setpoint during an off-line charging event.

16. The hybrid powertrain system of claim 10, wherein the initial charge-sustaining SOC setpoint comprises a minimum SOC state associated with operating the powertrain system in a charge-depletion mode.

17. The hybrid powertrain system of claim 10, wherein the initial charge-termination SOC setpoint comprises a maximum SOC associated with charging the DC power source.

18. The hybrid powertrain system of claim 10, wherein the electric energy equalization factor $\alpha$ is determined to adjust the charge-termination SOC setpoint for the DC power source that results in the DC power source storing an amount of electric energy that is the same as an amount of stored energy at BOL of the DC power source based upon the location, date of operation and the SOL.

\* \* \* \* \*